United States Patent [19]
McNeil

[11] 4,067,567
[45] Jan. 10, 1978

[54] SHEET ROLL ASSEMBLY FOR COPYING MACHINE

[76] Inventor: John McNeil, 1503 W. Windemere, Royal Oak, Mich. 48073

[21] Appl. No.: 769,895

[22] Filed: Feb. 18, 1977

[51] Int. Cl.² .......................................... B65H 29/64
[52] U.S. Cl. .............................. 271/172; 242/DIG. 3
[58] Field of Search ............................ 271/63, 172; 242/DIG. 3

[56] References Cited

U.S. PATENT DOCUMENTS

| 1,662,577 | 3/1928 | Johnson | 242/DIG. 3 |
| 3,406,921 | 10/1968 | Boston | 271/63 R X |

FOREIGN PATENT DOCUMENTS

| 473,812 | 5/1951 | Canada | 271/63 |

Primary Examiner—Richard A. Schacher
Attorney, Agent, or Firm—Hauke & Patalidis

[57] ABSTRACT

A sheet roll assembly for a copying machine in which a sheet reproduction of a sheet original is printed and processed, the sheet reproduction and original being conveyed to the outside of the machine after printing and processing. The sheet roll assembly is attached to the exterior of the machine proximate to and below the level at which a sheet emerges from the machine. The sheet roll assembly comprises a belt conveyor having an upper surface moving in a direction opposite to the direction of displacement of the emerging sheet and adapted to engage the leading edge of the sheet, and a curved plate mounted on the end of the upper surface of the belt conveyor for catching the leading edge of the sheet and causing the sheet to be spirally rolled against the curved plate, the sheet being continuously driven against the curved plate by the translation motion of the belt conveyor.

14 Claims, 3 Drawing Figures

SHEET ROLL ASSEMBLY FOR COPYING MACHINE

BACKGROUND OF THE INVENTION

The present invention relates to a sheet roll assembly for use in cooperation with an apparatus from which sheet material emerges, and more particularly, the invention relates to a receiving and roll assembly for rolling lengthy and cumbersome sheets shuch as original design tracings and/or reproductions emerging from a copying and processing machine, such as a blueprint printing and processing machine and the like.

The present invention has particular applications in copying machines for producing "blueprint" reproductions of a sheet original, such as tracings made on transparent or translucent paper, velum, or mylar bases. Such sheet original tracings are generally of large size and may have considerable length. The copying machine has a forward projecting table disposed below a slot-like opening and the sheet original, disposed above a sheet of duplicating paper treated with a photosensitive material such as diazo paper or the like, is manually introduced in contact with the photosensitive sheet into the machine through the opening. The two sheets are fed in unison by means of appropriate rollers and conveyor belts into the machine to provide exposure of the duplicating paper through the tracing sheet original acting as a photomask. After exposure, the sheet original and the sheet of duplicating paper are separated within the machine and the sheet original is caused to emerge from the machine through an opening generally disposed on the same side of the machine as the inlet opening, while the sheet reproduction is fed, by way of appropriately disposed rollers and conveyor belts, to another section of the machine where it is processed. After processing, the sheet reproduction is fed through an opening to the outside of the machine, such opening being generally disposed on an opposite side of the machine, and is conveyed into a receiving tray or onto a table. The sheet original may also be received into a tray disposed above the table of the machine but is generally allowed to be fed freely through the outlet opening and fall on the table.

From the above description it is readily apparent that the machine operator is faced with many problems. It is difficult for a single operator to handle both the material being fed into the machine and the material emerging from the machine, especially when the material is particularly lengthy. In such case, two operators are generally required, for handling the lengthy material fed into the machine and for manually rolling or folding the material as it emerges from the machine, and long tracings, especially on a mylar or similar base, are relatively heavy, and awkward to handle by a single person. In addition, mylar and velum tracings are generally stored in a rolled condition, and thus must be manually re-rolled while they emerge from the machine or, alternatively, prior to storing.

When handling extremely long sheet originals, the leading edge of the original often emerges from the machine while the trailing edge thereof is still on the table, thus causing entanglements and damages to costly original tracings.

Therefore many advantages result from providing a copying machine, such as a blueprint machine, with a roll mechanism for re-rolling original tracings as they emerge from the machine, automatically and without causing any damage to the costly tracings. As the operator of the machine is no longer required to manually roll the tracings as they emerge or to take the precaution that an emerging tracing does not tangle with the material being fed into the machine, there is no longer any requirement for two operators to be in attendance, there is a considerble reduction of the operator's work load, there is less risk of damaging the tracings, and the tracings are automatically obtained, as they emerge from the machine, in a rolled condition, thus eliminating the manual re-roll operation. If so desired, a sheet roll assembly according to the present invention may also be attached to the machine where the duplicating paper emerges after processing, such that the sheet reproductions are also obtained in spiral rolls.

There have been some attempts, in the past, to provide copying machines with tracing re-roll mechanisms. For example, in U.S. Pat. No. 3,406,921, there is disclosed a re-roll assembly for tracings emerging from a copying machine consisting of a tray having a V-shaped trough-like bottom panel provided with projecting rotating disks. Appropriate feed rollers direct the emerging tracing to the bottom of the trough, where it is rolled up by the rotating disks. Such an arrangement, wherein the tracing surface is engaged with relatively narrow rotating surfaces, may deteriorate the tracing, and requires that the tracing leading edge be directed at the apex of the trough in order for the tracing to be successfully re-rolled. If the leading edge of the tracing engages any portion of the trough other than the apex where the disks are disposed, automatic successful re-rolling of the tracing is not achieved.

SUMMARY OF THE INVENTION

The present invention permits to successfully roll up sheet material emerging from a copying machine and more particularly the original tracings by means of a belt conveyor disposed below the opening through which the sheet material emerges from the machine, the surface of the belt conveyor being disposed at an angle relative to the trajectory of the leading edge of the emerging sheet material such as to cause the leading edge thereof to engage the moving surface of the belt conveyor. The belt conveyor after engaging the leading edge of the sheet material displaces the leading edge in a direction opposite to the direction at which it emerges from the machine, and directs it in engagement with a curved plate which automatically causes the sheet material to be rolled in a spiral.

The many objects and advantages of the present invention will become more readily apparent to those skilled in the art when the following description of the best mode contemplated for practicing the invention is read in conjunction with the accompanying drawing wherein:

DETAILED DESCRIPTION OF THE PREFERRED EMBODIMENT

Figure 1:
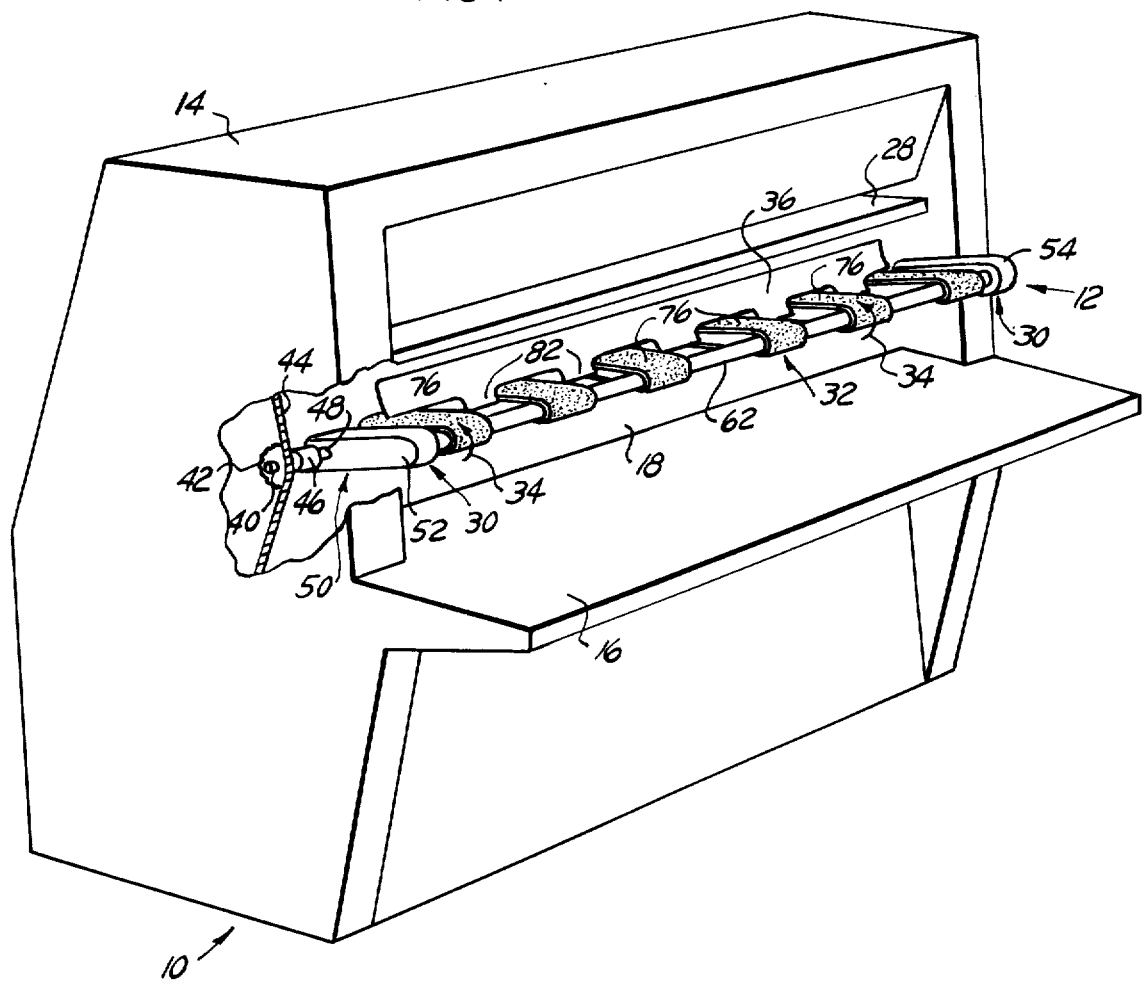
FIG. 1 is a schematic perspective view of a copying machine, with a section broken away to show part of the internal construction, provided with a sheet material roll assembly according to the present invention.
Figure 2:
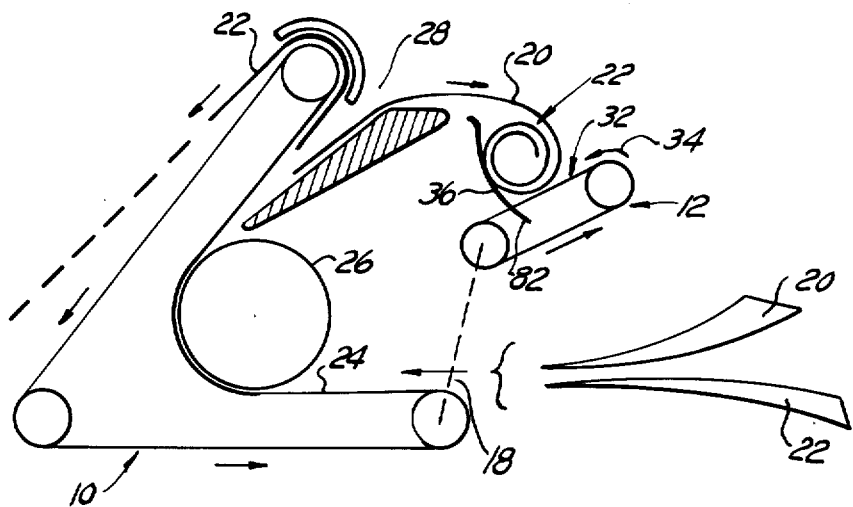
FIG. 2 is a schematic side elevation view, in section, of pertinent portions of the copying machine of FIG. 1.

Referring now to the drawing wherein like reference numerals refer to like or equivalent parts, and more particularly to FIG. 1, there is illustrated a conventional copying machine, such as a "blueprint" machine 10, provided with a sheet material roll assembly 12 according to the present invention. The copying machine 10 has a housing 14 which includes a table 16. The end of the table 16 projects into a feed-in or inlet opening 18 through which a sheet of original material and a sheet or reproduction material, such as tracing and photosensitive reproduction paper, are fed together into the machine in order to obtain a duplication of the original material, or master, on the reproduction paper, as shown at FIG. 2, numeral 20 representing the original or master such as a tracing, and numeral 22 representing the duplication paper such as a sheet of diazo paper. Inside the machine 10, as schematically shown at FIG. 2, the tracing or master 20 and the reproduction paper 22 are conveyed by means of a power driven conveyor belt 24 past an exposure or printing drum 26, after which the sheet original, or tracing, 20 is separated from the sheet reproduction 22. The sheet original 20 emerges from the copying machine 10 through an appropriate aperture 28, disposed above the entering aperture or opening 18, FIG. 1, while the sheet reproduction 22 is directed by the machine inner belt conveyor 24 to the processing section of the copying machine (not shown). From the processing section, the sheet reproduction is conveyed to the exterior of the machine 10 through an emerging aperture, not shown, generally disposed on the other side of the machine.

As shown at FIGS. 1 and 2, the sheet roll assembly 12 of the invention is disposed proximate to and below the outlet opening 28. The sheet roll assembly 12 consists of a frame, generally designated at 30, supporting a belt conveyor 32 whose upper surface is continuously translated in the direction of the arrow 34. At the end of the belt conveyor 32 a curved guide plate 36 is disposed to intercept the leading edge of the sheet original 20 and to impart a rolling motion to the sheet, the belt conveyor 32 imparting such rolling motion and driving the sheet against the curved plate 36. The upper surface of the belt conveyor 32 has a high coefficient of friction to provide a good grip on the surface of the sheet material.

As shown at FIGS. 1 and 2, the frame 30 of the belt conveyor 32 is mounted, at its ends, by any convenient means such as mounting brackets and the like, not shown, preferably in a detachable manner on the side members of the machine 10 at an angle such that the plane of the upper surface of the belt conveyor 32 is angled relative to the horizontal with the outmost end of the belt conveyor 32 inclined towards the level at which the sheet 20 emerges from the machine through the opening 28. In this manner, the upper surface of the belt conveyor 32 is caused to intercept the normal trajectory of the emerging sheet 20 and tends to start the roll-up motion of the sheet even before the sheet engages the curved plate 36.

The belt conveyor 32 of the sheet roll assembly 12 is driven by any convenient means such as being provided with an electrical drive motor or, preferably, by being connected as shown at FIG. 1, to the drive mechanism of the copying machine 10. For that purpose, a sprocket wheel 40 keyed to a stub shaft 42 is mounted on the inside of the copying machine 10, the stub shaft 42 journalling in an appropriate support and bearing bracket, not shown, fastened to the inside of the machine housing 14, and the sprocket wheel 42 engages an endless chain 44 forming part of the copying machine drive mechanism. The stub shaft 42 has an end coupled through a coupling 46 to the power input shaft 48 of the drive 50 for the belt conveyor 32.

Figure 3:
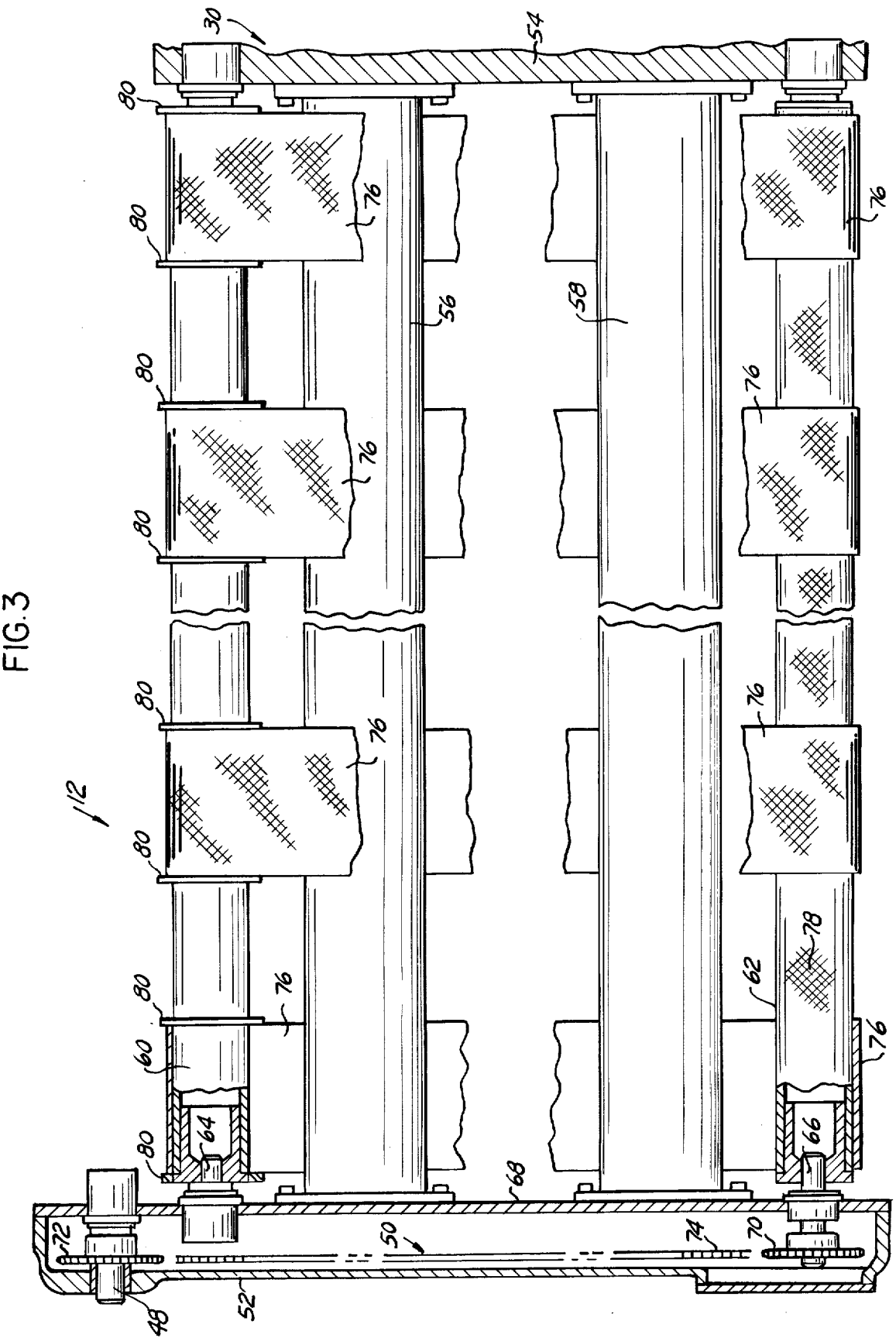
FIG. 3 is a top plan view, with portions shown in section or broken away, of the sheet roll assembly according to the present invention.

As shown in detail at FIG. 3, the frame 30 of the sheet roll assembly 12 of the invention comprises an end housing 52 in which is disposed the drive 50 of the conveyor belt 34, and another end plate 54. The end housing 52 and the end plate 54 are rigidly held apart by means of transversely extending members 56 and 58, which may be each in the form of a rectangular hollow box or in the form of a plate, having their lateral end appropriately bolted or welded to the end housing 52 and the end plate 54.

A pair of rollers 60 and 62, mounted respectively on shafts 64 and 66, are disposed spaced apart and parallel to each other, the end of the shafts 64 and 66 journalling in the end plate 54 and in a sidewall 68 of the housing 52. The shaft 66 of the roller 62 projects within the housing 52 and is provided on its end with a sprocket wheel 70 rigidly fastened thereto. The input shaft 48, journalled in the housing 52 as shown, is provided with a sprocket wheel 72 keyed thereon, and an endless chain 74 is wound around the sprocket wheels 72 and 70 such that rotation of the input shaft 48, driven by the drive mechanism of the machine, in turn causes driving of the roller 62. The belt conveyor 32 comprises several endless belt sections 76 made of flexible material such as rubber or rubber impregnated multi-ply canvas and having surfaces with a high coefficient of friction, and the surface of the driving roller 62 is preferably provided with knurls 78, or other arrangement such as grooves or the like, for providing a better grip on the bottom surface of the belt sections 76. The roller 60 is preferably provided with washer-like annular members 80, welded or otherwise fastened to the peripheral surface of the roller, to act as guiding members to keep the belt sections 76 in spaced relationship.

As best shown at FIGS. 1 and 2, the curved plate 36 has a plurality of projecting portions or fingers 82 projecting downwardly between the belt sections 76, such as to prevent the leading edge of the sheet material being rolled by the mechanism of the invention from passing below the curved plate 36.

Having thus described the present invention by way of a typical structural embodiment thereof, modifications whereof will be apparent to those skilled in the art, what is claimed as new is as follows:

1. In a copying machine for printing and processing a sheet reproduction of a sheet original wherein said sheet original is conveyed to the outside of the machine after printing of said sheet reproduction and said sheet reproduction is conveyed to the outside of said machine after processing of said sheet reproduction, a sheet roll assembly comprising a frame fastened to the exterior of said machine proximate to and below the level at which one of said sheets emerges to the outside of said machine, a belt conveyor supported by said frame, said belt conveyor having an upper surface disposed in the path of the leading edge of said sheet and translated in a direction opposite to the direction of displacement of said sheet, and a curved plate fixedly mounted on said frame at the end of said upper surface of said belt conveyor for engagement with said sheet for causing said sheet to be spirally rolled.

2. The sheet roll assembly of claim 1 wherein said frame is detachably fastened to the exterior of said machine.

3. The sheet roll assembly of claim 1 wherein the upper surface of said belt conveyor is disposed in a plane inclined toward the level at which said sheet emerges from said machine.

4. The sheet roll assembly of claim 1 wherein said belt conveyor comprises an idler roller supported by said frame, a power-driven roller supported by said frame spaced apart and substantially parallel to said idler roller and an endless belt wound about said rollers for driving by said power driven roller.

5. The sheet roll assembly of claim 4 wherein a first sprocket wheel is fastened to the end of said power-driven roller, a second sprocket wheel is mounted on said frame in substantially lateral alignment with said first sprocket wheel, a rotatable shaft supports said second sprocket wheel, an endless chain is wound about said first and second sprocket wheels, and means are provided for coupling said shaft to said copying machine drive mechanism.

6. The sheet roll assembly of claim 4 wherein said endless belt is longitudinally split in separate spaced apart sections and said curved plate has portions projecting between said spaced apart sections.

7. The sheet roll assembly of claim 5 wherein said endless belt is longitudinally split in separate spaced apart sections and said curved plate has portions projecting between said spaced apart sections.

8. The sheet roll assembly of claim 6 wherein said power-driven roller has a knurled peripheral surface.

9. The sheet roll assembly of claim 7 wherein said power-driven roller has a knurled peripheral surface.

10. The sheet roll assembly of claim 1 wherein said upper surface of said belt conveyor has a substantially high coefficient of friction.

11. The sheet roll assembly of claim 3 wherein said upper surface of said belt conveyor has a substantially high coefficient of friction.

12. The sheet roll assembly of claim 4 wherein said upper surface of said belt conveyor has a substantially high coefficient of friction.

13. The sheet roll assembly of claim 5 wherein said upper surface of said belt conveyor has a substantially high coefficient of friction.

14. The sheet roll assembly of claim 6 wherein said upper surface of said belt conveyor has a substantially high coefficient of friction.

* * * * *